US012424864B2

(12) United States Patent
Fong et al.

(10) Patent No.: US 12,424,864 B2
(45) Date of Patent: Sep. 23, 2025

(54) POWER SUPPLY UNIT CHARGING MODES

(71) Applicant: Microsoft Technology Licensing, LLC, Redmond, WA (US)

(72) Inventors: Chee Kiong Fong, Saratoga, CA (US); Michael Roy Volkman, Seattle, WA (US); Suet Fong Tin, Redmond, WA (US); Geoffrey Jason Shew, Redmond, WA (US); Edward Charles Giaimo, III, Bellevue, WA (US); Cindy-Kay Forsyth-Martinez, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 623 days.

(21) Appl. No.: 17/453,275

(22) Filed: Nov. 2, 2021

(65) Prior Publication Data

US 2023/0043117 A1   Feb. 9, 2023

Related U.S. Application Data

(60) Provisional application No. 63/260,046, filed on Aug. 6, 2021.

(51) Int. Cl.
*H02J 7/00*  (2006.01)
(52) U.S. Cl.
CPC ........ *H02J 7/0071* (2020.01); *H02J 7/00034* (2020.01); *H02J 7/00036* (2020.01); *H02J 7/0047* (2013.01)
(58) Field of Classification Search
CPC .................................................... H02J 7/0071
See application file for complete search history.

(56) References Cited

U.S. PATENT DOCUMENTS 4,297,630 A   10/1981   Mullersman
9,270,134 B2   2/2016   Gaddam et al.
(Continued)

FOREIGN PATENT DOCUMENTS

EP    3101768 A1    12/2016
EP    3866301 A1 *  8/2021 ............... H02J 5/00
WO   2015168826 A1  11/2015

OTHER PUBLICATIONS

"International Search Report and Written Opinion Issued in PCT Application No. PCT/US22/036047", Mailed Date: Oct. 28, 2022, 12 Pages.
(Continued)

*Primary Examiner* — Drew A Dunn
*Assistant Examiner* — Tynese V McDaniel
(74) *Attorney, Agent, or Firm* — Alleman Hall & Tuttle LLP

(57) ABSTRACT

A power supply unit (PSU) configured to provide electrical power to an electronic device. The PSU may include a PSU control circuit configured to, via a power meter, detect that electrical power conveyed to the electronic device is above a timer starting threshold. In a first charging mode with a first predetermined charging duration, the PSU control circuit may control the PSU to convey electrical power to the electronic device with a first power ceiling. Subsequently to the first predetermined charging duration elapsing, in a second charging mode with a second predetermined charging duration, the PSU control circuit may control the PSU to convey electrical power to the electronic device with a second power ceiling that is lower than the first power ceiling. Subsequently to the second predetermined charging duration elapsing, the PSU control circuit may control the PSU to return to the first charging mode.

20 Claims, 10 Drawing Sheets

(56) References Cited

U.S. PATENT DOCUMENTS

| | | |
|---|---|---|
| 9,748,782 B1 | 8/2017 | Sheng et al. |
| 9,921,624 B1 | 3/2018 | Okamura et al. |
| 2003/0043520 A1 | 3/2003 | Mikosz et al. |
| 2006/0119324 A1 | 6/2006 | Kim |
| 2007/0284431 A1 | 12/2007 | Pan |
| 2008/0074084 A1 | 3/2008 | Lee et al. |
| 2008/0136368 A1 | 6/2008 | Hajiaghajani |
| 2008/0222431 A1 | 9/2008 | Paniagua et al. |
| 2008/0238356 A1 | 10/2008 | Batson et al. |
| 2009/0146826 A1 | 6/2009 | Gofman et al. |
| 2010/0256709 A1* | 10/2010 | Kallmyer ............. A61N 1/3787 607/61 |
| 2013/0193914 A1* | 8/2013 | Gaddam ................ H02J 50/80 320/108 |
| 2014/0191731 A1* | 7/2014 | Miura ...................... H02J 7/00 320/157 |
| 2014/0297055 A1 | 10/2014 | Funakubo |
| 2015/0113310 A1 | 4/2015 | Mistry et al. |
| 2017/0357298 A1 | 12/2017 | Hovis et al. |
| 2018/0183254 A1 | 6/2018 | Park et al. |
| 2019/0356153 A1 | 11/2019 | Wan et al. |
| 2019/0356161 A1 | 11/2019 | Wakazono et al. |
| 2019/0389315 A1* | 12/2019 | Zhu ......................... B60L 53/64 |
| 2020/0083739 A1 | 3/2020 | Zhang et al. |
| 2020/0276446 A1* | 9/2020 | Kelly ................... A61N 1/3787 |
| 2020/0310519 A1* | 10/2020 | Ranta ........................ G06F 1/26 |
| 2023/0143535 A1* | 5/2023 | Masuda ................. H02J 50/12 320/108 |
| 2023/0268752 A1* | 8/2023 | Gustafsson ............. H03K 3/57 320/166 |

OTHER PUBLICATIONS

He, et al., "iCharge: User-Interactive Charging of Mobile Devices", In Proceedings of the 15th Annual International Conference on Mobile Systems, Applications, and Services, Jun. 19, 2017, 14 Pages.

Hoque, et al., "A Temperature Based Automatic Power Controller for Electrical Devices", In International Journal of Advanced Science and Technology, vol. 63, Feb. 28, 2014, 8 Pages.

* cited by examiner

```
┌─────────────────────────────────────────────────────────────┐
│ IN RESPONSE TO THE FIRST PREDETERMINED CHARGING DURATION    │
│ ELAPSING, DETERMINING THAT THE ELECTRICAL POWER CONVEYED    │──122
│ TO THE ELECTRONIC DEVICE IS WITHIN A PREDETERMINED POWER    │
│ CHANGE THRESHOLD OF THE FIRST POWER CEILING                 │
└─────────────────────────────────────────────────────────────┘
                              │
                              ▼
┌─────────────────────────────────────────────────────────────┐
│ IN RESPONSE TO DETERMINING THAT THE ELECTRICAL POWER IS     │
│ WITHIN THE PREDETERMINED POWER CHANGE THRESHOLD OF THE      │
│ FIRST POWER CEILING, CONTROLLING THE PSU TO REMAIN IN THE   │──124
│ FIRST CHARGING MODE FOR AN ADDITIONAL CHARGING DURATION     │
│ PRIOR TO ENTERING THE SECOND CHARGING MODE                  │
└─────────────────────────────────────────────────────────────┘
```

FIG. 6C

```
┌─────────────────────────────────────────────────────────────┐
│ SUBSEQUENTLY TO THE SECOND PREDETERMINED CHARGING DURATION  │
│ ELAPSING AND PRIOR TO RETURNING TO THE FIRST CHARGING MODE, │
│ IN A THIRD CHARGING MODE WITH A THIRD PREDETERMINED         │──126
│ CHARGING DURATION, CONTROLLING THE PSU TO CONVEY ELECTRICAL │
│ POWER TO THE ELECTRONIC DEVICE WITH A THIRD POWER CEILING,  │
│ WHEREIN THE THIRD POWER CEILING IS LOWER THAN THE SECOND    │
│ POWER CEILING                                               │
└─────────────────────────────────────────────────────────────┘
                              │
                              ▼
┌─────────────────────────────────────────────────────────────┐
│ SUBSEQUENTLY TO THE THIRD PREDETERMINED CHARGING DURATION   │──128
│ ELAPSING, RETURNING TO THE FIRST CHARGING MODE              │
└─────────────────────────────────────────────────────────────┘
```

FIG. 6D

POWER SUPPLY UNIT CHARGING MODES

CROSS REFERENCE TO RELATED APPLICATIONS

This application claims priority to U.S. Provisional Patent Application Ser. No. 63/260,046, filed Aug. 6, 2021, the entirety of which is hereby incorporated herein by reference for all purposes.

BACKGROUND

A power supply unit (PSU) of a mobile computing device is a device that is configured to supply conditioned electrical power to a battery and to other electronic components of the mobile computing device while the PSU is electrically coupled to an external power source. In this way, the PSU may be configured to charge the battery of the mobile computing device while connected to a wall outlet (i.e., mains power), a generator, a solar cell, or some other external electrical power source. In addition, the PSU may be configured to provide electrical power to other components of the mobile computing device while the battery is charging. The PSU may be configured to convert an alternating current (AC) input supplied by the electrical power source to a direct current (DC) output supplied to the battery and electrical components of the mobile computing device, and/or transform an input voltage supplied by the electrical power source into an output voltage that is suitable for charging the battery and operating the mobile computing device. In some cases, the PSU may be configured to operate in multiple modes of power conversion, and thus may accommodate multiple current types and voltages levels as input. The PSU may also be configured to output multiple voltages depending on power requirements of the mobile computing device.

SUMMARY

According to one aspect of the present disclosure, a power supply unit (PSU) is provided that is configured to provide electrical power to an electronic device including a battery. The PSU may include a PSU control circuit. Subsequently to the PSU becoming electrically coupled to the electronic device, the PSU control circuit may be configured to, via a power meter included in the PSU control circuit, detect that electrical power conveyed to the electronic device is above a timer starting threshold. In response to detecting that the electrical power is above the timer starting threshold, in a first charging mode with a first predetermined charging duration, the PSU control circuit may be further configured to control the PSU to convey electrical power to the electronic device with a first power ceiling. Subsequently to the first predetermined charging duration elapsing, in a second charging mode with a second predetermined charging duration, the PSU control circuit may be further configured to control the PSU to convey electrical power to the electronic device with a second power ceiling. The second power ceiling may be lower than the first power ceiling. Subsequently to the second predetermined charging duration elapsing, the PSU control circuit may be further configured to control the PSU to return to the first charging mode.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6C shows additional steps of the method of FIG. 6A that may be performed in some examples when the first predetermined charging duration ends.

FIG. 6D shows additional steps of the method of FIG. 6A that may be performed in some examples when the second predetermined charging duration ends.

DETAILED DESCRIPTION

As described above, conventional PSUs have been developed to power many portable electronic devices, charging their batteries and supplying power to other electrical components of the portable electronic devices when connected to a power source such as mains power. Yet, despite these advances, many technical challenges remain for conventional PSUs. For example, when the battery of a mobile computing device is charged in a fast charging mode, the mobile computing device may draw high power from the PSU. However, after the battery is substantially fully charged, the power drawn by the mobile computing device typically drops. If the PSU is configured to always operate in high power mode, then after the battery is substantially fully charged, the PSU may have excess power capacity. This excess power capacity may result in higher power losses in the form of heat compared to those of a PSU configured for low power operation.

In order to dissipate heat that accumulates during charging, existing PSUs typically have large outer cases. Magnetic assemblies included in existing PSUs are also typically large in order to provide a high surface area for dissipation of heat to the outer casing. Thus, existing PSUs may be bulky and may require large amounts of raw materials to manufacture.

Figure 1A:
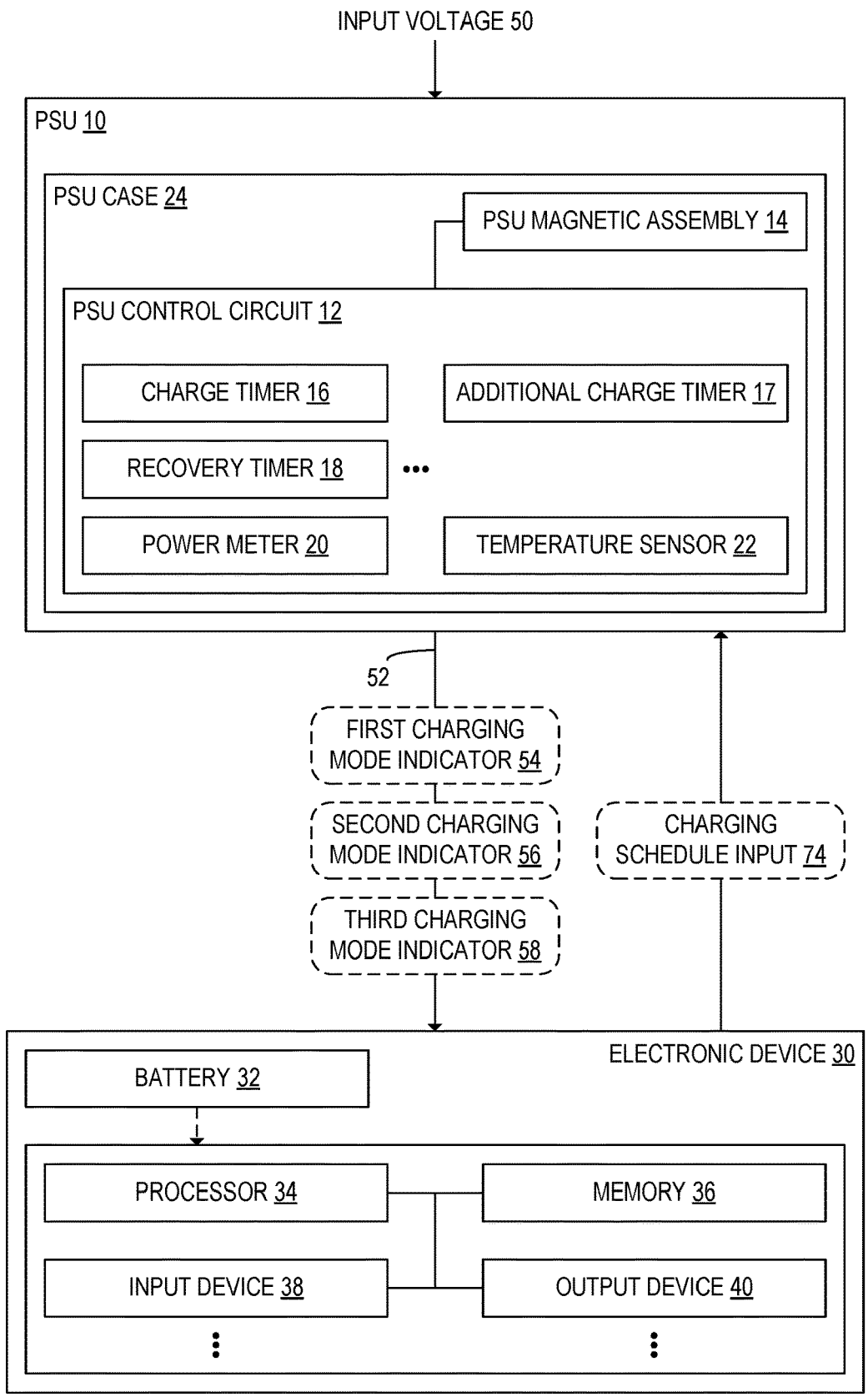
FIGS. 1A and 1B schematically show a PSU electrically coupled to an electronic device, according to two example embodiments.
Figure 1B:
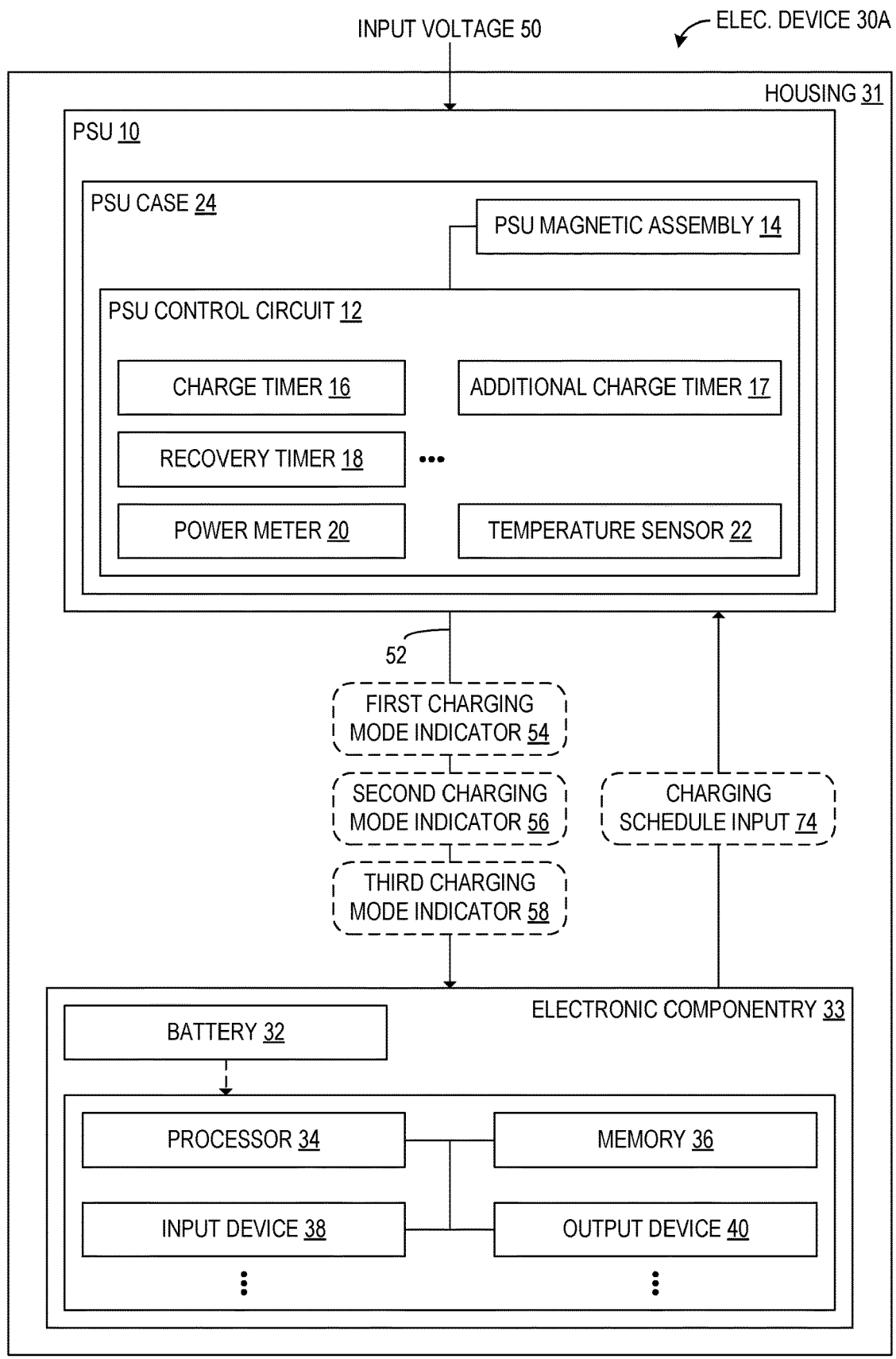

In order to address the above challenges, a PSU 10 is provided, as depicted schematically in FIGS. 1A and 1B. FIG. 1A illustrates an electronic device 30 coupled to the PSU 10. Continuing with the example of FIG. 1A the PSU 10 may be configured to provide electrical power to an electronic device 30, which may include a battery 32. When the PSU provides electrical power to the battery 32, the PSU 10 may be further configured to provide electrical power to one or more other electronic components of the electronic device 30. The other electronic components may, for example, include a processor 34 and memory 36. The one or more other electronic components may further include one or more input devices 38, which may, for example, include one or more buttons, switches, touch-sensitive surfaces, microphones, accelerometers, optical sensors, temperature sensors, global positioning sensors, and/or other types of input devices. Additionally or alternatively, the one or more other electronic components may include one or more output devices 40, which may, for example, include one or more displays, speakers, haptic feedback devices, and/or other types of output devices. In some examples, the electronic device 30 may be a mobile computing device such as a smartphone, a tablet, a portable video game system, or some other type of mobile computing device. In other examples, the electronic device may be a stationary electronic device, such as a server or other computer with a backup battery to ensure operation during a power outage.

The PSU 10, as depicted in FIG. 1A, may include a PSU control circuit 12 and a PSU magnetic assembly 14. The PSU control circuit 12 and the PSU magnetic assembly 14 may be provided within a PSU case 24. The PSU 10 may be configured to receive an input voltage 50 from an input voltage source such as a wall outlet, a generator, a solar cell, or some other voltage source. At the PSU magnetic assembly 14, the PSU 10 may be further configured to transform the input voltage 50 into an output voltage signal 52 that has a suitable voltage and current for charging the battery 32 and operating the one or more other electronic components included in the electronic device 30. The PSU magnetic assembly 14 may include a transformer and may further include an AC/DC converter. At least a portion of the PSU magnetic assembly 14 may, for example, be formed as a wire wrapped around an iron core. The PSU control circuit 12 may be configured to control the flow of electric current through the PSU magnetic assembly 14 to the electronic device 30.

The PSU control circuit 12 may include a charge timer 16 and a recovery timer 18 that are respectively configured to time a first predetermined charging duration and a second predetermined charging duration, as discussed in further detail below. The PSU control circuit 12 may include a plurality of recovery timers 18 in some examples. Additionally or alternatively, in some examples, the PSU control circuit 12 may further include an additional charge timer 17 that is configured to time an additional charging duration. The PSU control circuit 12 may further include a power meter 20 that is configured to measure the electrical power flowing to the electronic device 30. In some examples, the power meter 20 may be an ammeter configured to measure the electric current, and the PSU control circuit 12 may be configured to compute the electrical power based on the measured electric current. The PSU control circuit 12 may, in some examples, further include a temperature sensor 22. The temperature sensor 22 may, for example, be used provide the PSU control circuit 12 with an emergency shutoff feature that controls the PSU 10 to stop supplying current to the electronic device 30 when the temperature of the PSU 10 exceeds a shutoff threshold.

In the example of FIG. 1B, the PSU 10 is provided within a housing 31 of an electronic device 30A rather than being located outside an electronic device 30 as in the example of FIG. 1A. FIG. 1B schematically shows the PSU 10 electrically coupled to electronic componentry 33 within the housing 31. The electronic componentry may, for example, include the battery 32, the processor 34, the memory 36, one or more input devices 38, and/or one or more output devices 40. In one example, the electronic device 30A may be a non-portable computing device, such a server computing device or a desktop computing device, that has battery backup.

Figure 2:
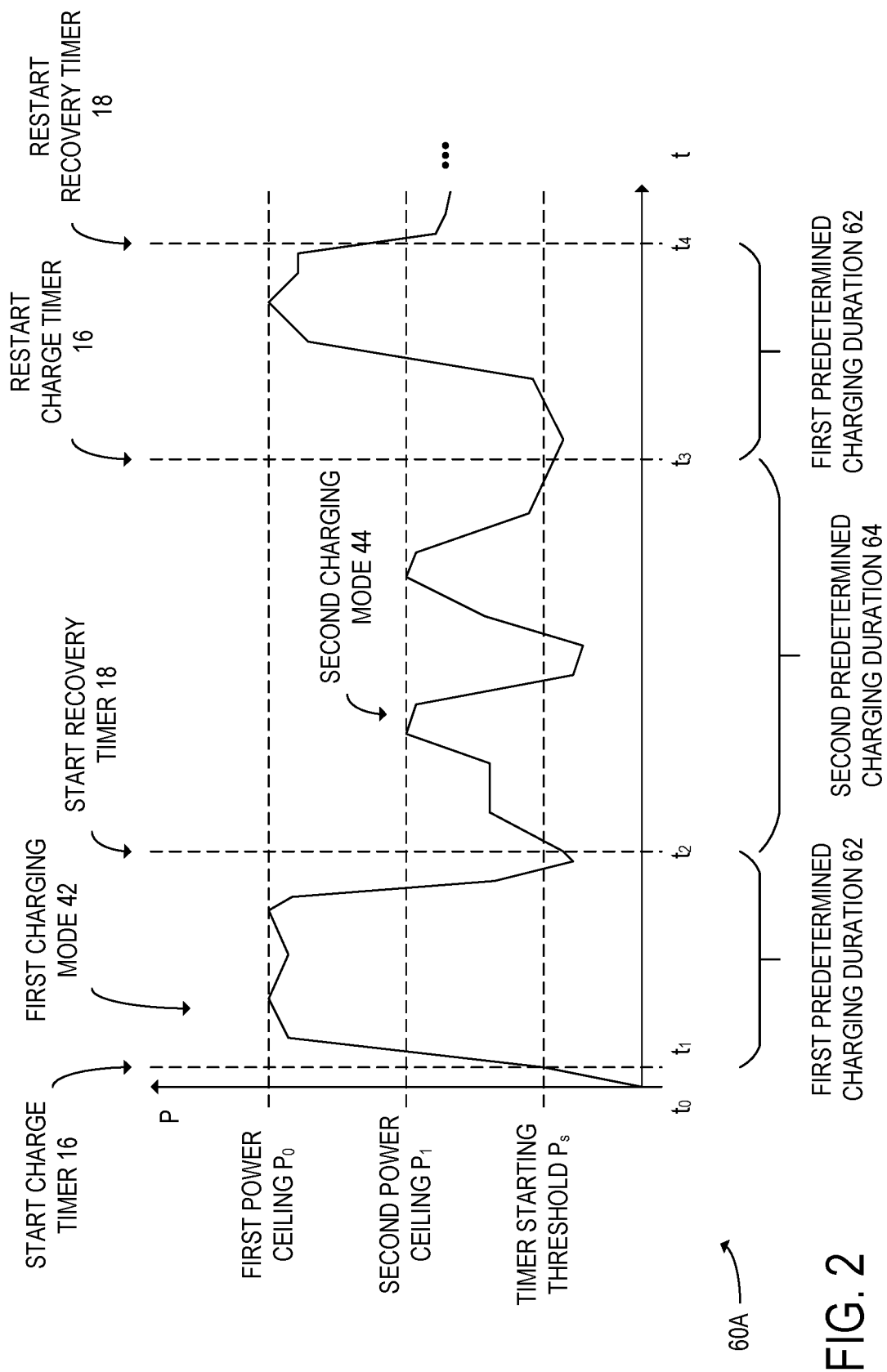
FIG. 2 shows an example first plot of the electrical power conveyed to the electronic device by the PSU as a function of time during a first predetermined charging duration and a second predetermined charging duration, according to the example of FIGS. 1A and 1B.

FIG. 2 shows an example first plot 60A of the electrical power conveyed to the electronic device 30 by the PSU 10 as a function of time. In the example of FIG. 2, the PSU 10 becomes electrically coupled to the electronic device 30 at time $t_0$. While the electronic device 30 is coupled to the PSU 10, the electrical power conveyed to the electronic device 30 may fluctuate over time as a function of the charge level of the battery 32, the power demand of the one or more other electronic components included in the electronic device 30, the temperature of the PSU 10, the ambient temperature of the environment in which the PSU 10 is located, and/or one or more settings of the electronic device 30. Other factors in addition to those listed above may affect the amount of electrical power supplied to the electronic device 30.

As shown in the example of FIG. 2, subsequently to the PSU 10 becoming electrically coupled to the electronic device 30 at time $t_0$, the PSU 10 may be configured to detect that electrical power conveyed to the electronic device 30 is above a timer starting threshold $P_s$. For example, the electrical power supplied to the electronic device 30 may cross the timer starting threshold $P_s$ at a time $t_1$ that occurs shortly after the time $t_0$ at which the PSU 10 becomes electrically coupled to the electronic device 30.

In response to detecting that the electrical power is above the timer starting threshold $P_s$, the PSU control circuit 12 may be further configured to control the PSU 10 to enter a first charging mode 42. In the first charging mode 42, the PSU 10 may be configured to convey electrical power to the electronic device 30 with a first power ceiling $P_0$. When the electrical power conveyed to the electronic device 30 in the output voltage signal 52 reaches the first power ceiling $P_0$, the PSU control circuit 12 may be configured to reduce the electrical power provided to the electronic device 30 such that the electrical power does not exceed the first power ceiling $P_0$.

The PSU control circuit 12 may be configured to control the PSU 10 to remain in the first charging mode 42 for a first predetermined charging duration 62. At the beginning of the first predetermined charging duration 62, the PSU control circuit 12 may be configured to start the charge timer 16. The first predetermined charging duration 62 may end when the charge timer 16 reaches zero. By starting the charge timer 16 in response to the electrical power conveyed to the electronic device 30 crossing the timer starting threshold $P_s$, the PSU charging circuit 12 may be configured to use the charge timer 16 to time a period in which the PSU 10 is in a fast charging mode and is drawing a high level of electrical power, and during which it is prone to heat up. Thus, the PSU control circuit 12 may be configured to time the beginning and ending of the first predetermined charging duration 62 to accurately reflect the beginning and ending of a fast charging period.

Subsequently to the first predetermined charging duration 62 elapsing, the PSU control circuit 12 may be further configured to control the PSU 10 to enter a second charging mode 44. In the second charging mode 44, the PSU control circuit 12 may be configured to control the PSU 10 to convey electrical power to the electronic device 30 with a second power ceiling $P_1$. As depicted in FIG. 2, the second power ceiling $P_1$ may be lower than the first power ceiling $P_0$. Thus, when the first predetermined charging duration 62 ends, the PSU control circuit 12 may be configured to control the PSU 10 to reduce the amount of electrical power that may be provided to the electronic device 30. Reducing the power ceiling from the first power ceiling $P_0$ to the second power ceiling $P_1$ may allow the PSU 10 to cool. By remaining in the first charging mode 42 for the first predetermined charging duration 62 subsequently to crossing the timer starting threshold $P_s$, and entering the second charging mode 44 when the first predetermined charging duration 62 has elapsed, the PSU 10 may be configured to provide fast charging for the battery 32 during the first predetermined charging duration 62 while also avoiding high temperatures that may otherwise result from remaining in the first charging mode 42 for an extended period of time. In addition, using predetermined charging durations may allow the PSU control circuit 12 to control the PSU 10 to avoid high temperatures without having to perform temperature measurements.

The PSU 10 may be configured to remain in the second charging mode 44 for a second predetermined charging duration 64. At the beginning of the second predetermined charging duration 64, the PSU control circuit 12 may be configured to start the recovery timer 18. At time $t_3$, subsequently to the second predetermined charging duration 64 elapsing, the PSU control circuit 12 may be further configured to control the PSU 10 to return to the first charging mode 42. When the PSU 10 returns to the first charging mode 42, the PSU control circuit 12 may be configured to restart the charge timer 16. In some examples, the PSU control circuit 12 may be configured to cycle between the first charging mode 42 and the second charging mode 44. As shown in the example of FIG. 2, the PSU control circuit 12 may be configured to control the PSU 10 to return to the second charging mode 44 when the charge timer 16 reaches zero after having been restarted. When the PSU control circuit 12 controls the PSU 10 to return to the second charging mode 44, the PSU control circuit 12 may be configured to restart the recovery timer 18.

Returning to FIG. 1A, in some examples, the PSU control circuit 12 may be further configured to transmit a first charging mode indicator 54 to the electronic device 30 at a beginning of the first predetermined charging duration 62. In addition, the PSU control circuit 12 may be further configured to transmit a second charging mode indicator 56 to the electronic device 30 at a beginning of the second predetermined charging duration 64. Accordingly, the PSU control circuit 12 may be configured to notify the processor 34 of the electronic device 30 when the PSU 10 enters the first charging mode 42 and when the PSU 10 enters the second charging mode 44.

In some examples, the second charging mode indicator 56 may include instructions for the electronic device 30 to enter a power-saving mode. When the electronic device 30 is in the power-saving mode, the processor 34 of the electronic device 30 may be configured to output instructions for one or more electronic components of the electronic device 30 to reduce their power consumption. For example, a display provided as an output device 40 of the electronic device 30 may be dimmed when the electronic device enters the power-saving mode. In examples in which the electronic device 30 enters the power-saving mode, in response to the PSU 10 returning to the first charging mode 42, the PSU control circuit 12 may be further configured to transmit a third charging mode indicator 58 to the electronic device 30. The third charging mode indicator 58 may include instructions for the electronic device 30 to exit the power-saving mode.

In some examples, neither the first charging mode indicator 54 nor the second charging mode indicator 56 may indicate an emergency shutdown threshold or a temperature measurement. Thus, communication between the PSU 10 and the electronic device 30 may be simplified compared to communication between existing PSUs and electronic devices. In addition, a sensor suite included in the PSU 10 may be simplified.

In some examples, the length of the first predetermined charging duration 62 may be hard-coded into the PSU control circuit 12. For example, when the PSU 10 is specialized for use with a particular type of electronic device 30, the first predetermined charging duration 62 may be set based on experimental data. For example, the experimental data may include amounts of heat generated at and dissipated by the PSU 10 at different power output levels. The length of the second predetermined charging duration 64 may also be hard-coded into the PSU control circuit 12 in some examples.

In other examples, the first predetermined charging duration 62 and/or the second predetermined charging duration 64 may be programmable by a user of the PSU 10. In such examples, the PSU control circuit 12 may be further configured to receive, from the electronic device 30, a charging schedule input 74 that indicates a length of the first predetermined charging duration 62. The PSU control circuit 12 may be further configured to set the first predetermined charging duration 62 as specified by the charging schedule input 74. Additionally or alternatively, in some examples, the charging schedule input 74 may indicate a length of the second predetermined charging duration 64. In such examples, the PSU control circuit 12 may be further configured to set the second predetermined charging duration 64 as specified by the charging schedule input 74.

The lengths of the first predetermined charging duration 62 and/or the second predetermined charging duration 64 specified by the charging schedule input 74 may, in some examples, be stored at the PSU control circuit 12 and used in one or more subsequent charging sessions. In other examples, the PSU control circuit 12 may be configured to receive the charging schedule input 74 from the electronic device 30 at the beginning of each charging session or when the power supplied to the electronic device exceeds the timer starting threshold $P_s$. The PSU control circuit 12 may, in some examples, be configured to receive separate charging schedule inputs 74 based on which the PSU control circuit 12 is configured to set the first predetermined charging duration 62 and the second predetermined charging duration 64, respectively.

Figure 3:
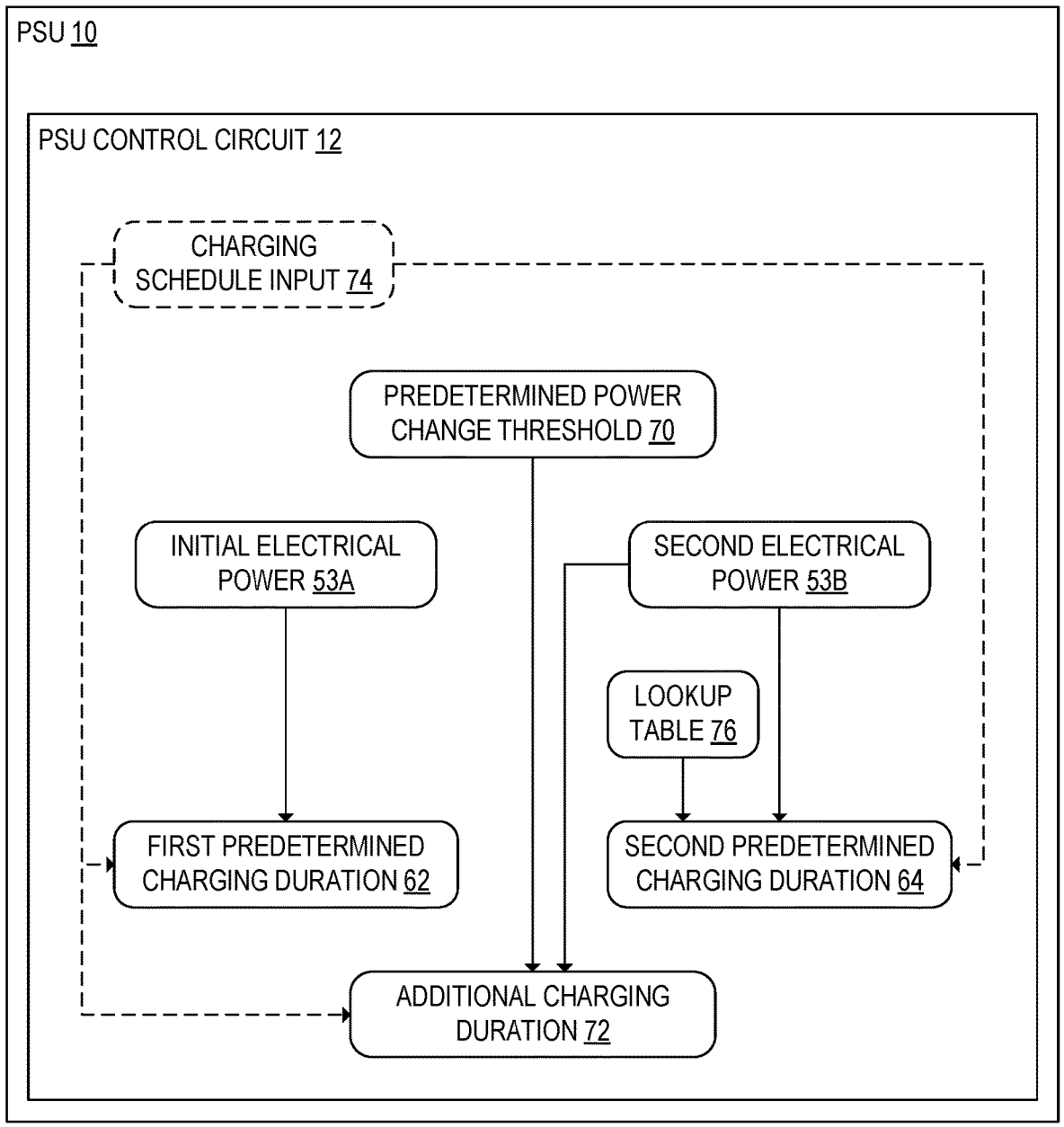
FIG. 3 schematically shows a PSU control circuit of the PSU in additional detail when the first predetermined charging duration and the second predetermined charging duration are computed, according to the example of FIG. 1A.

In some examples, rather than explicitly defining the first predetermined charging duration 62 and the second predetermined charging duration 64, the charging schedule input 74 may provide the PSU control circuit 12 with data that is used to compute the first predetermined charging duration 62 and/or the second predetermined charging duration 64 in combination with one or more other inputs. In such examples, the first predetermined charging duration 62 and/or the second predetermined charging duration 64 may be computed programmatically at the PSU control circuit 12. FIG. 3 schematically shows the PSU control circuit 12 in additional detail when the first predetermined charging duration 62 and the second predetermined charging duration 64 are computed, according to one example.

In some examples, as depicted in FIG. 3, the PSU control circuit 12 may be configured to set the first predetermined charging duration 62 based at least in part on an initial electrical power 53A. The initial electrical power 53A is an electrical power conveyed to the electronic device 30 when (i.e., substantially at a time at which) the PSU control circuit 12 detects that the electrical power conveyed to the electronic device 30 is above the timer starting threshold $P_s$, as measured by the power meter 20. It will be appreciated that the PSU control circuit may operate in such a manner that it samples the electrical power values in a time-discretized manner and performs a check to determine when the timer starting threshold $P_s$ is exceeded after sampling. Thus, the initial electrical power 53A may be determined at a sampling timing that is slightly after the detection of the electrical power exceeding the time starting threshold $P_s$, and for this reason the relative timing between the initial electrical power value determination and the detection of the threshold being exceeded is described to be substantially at the same time, rather than exactly at the same time. The PSU control circuit 12 may accordingly be configured to estimate a time derivative of the electrical power in some examples. In such examples, the PSU control circuit 12 may be configured to determine a rate at which the electrical power provided to the electronic device 30 increases when the electrical power crosses the timer starting threshold $P_s$. Thus, the PSU control circuit 12 may be configured to distinguish between scenarios in which the electronic device 30 draws an amount of electrical power above the timer starting threshold $P_s$ immediately after becoming coupled to the PSU 10 and scenarios in which the amount of electrical power drawn by the electronic device 30 increases more gradually while the electronic device 30 is in use. By setting the first predetermined charging duration based at least in part on the initial electrical power 53A, the PSU control circuit 12 may dynamically select the second predetermined charging duration to reflect an estimated temperature accumulated at the PSU 10, with the second electrical power 53B acting as a proxy for the temperature. The relationship between the initial electrical power 53A and the temperature of the PSU 10 may, for example, be estimated from experimental data. This may aid in more precisely controlling the temperature of the PSU 10, while allowing for a potential increase the performance of the electronic device 30.

In some examples, the PSU control circuit 12 may be configured to set the second predetermined charging duration 64 based at least in part on a second electrical power 53B. The second electrical power 53B is an electrical power conveyed to the electronic device 30 when (i.e., substantially at a time at which) the first predetermined charging duration 62 elapses, as measured by the power meter 20. The relative timing of the sampling of the second electrical power 53B and the detection of the end of the predetermined charge duration 62 may be affected by slight variations due to time-discretization as discussed above and is thus described as occurring substantially at the same time. For example, the PSU control circuit 12 may be configured to set the recovery timer 18 to a longer second predetermined charging duration 64 when the amount of electrical power drawn by the electronic device 30 at the end of the first predetermined charging duration 62 is higher, and to set the recovery timer 18 to a shorter second predetermined charging duration 64 when the amount of electrical power drawn by the electronic device 30 at the end of the first predetermined charging duration 62 is lower. In some examples, a lookup table 76 that maps a plurality of power levels to a respective plurality of second predetermined charging durations 64 may be implemented at the PSU control circuit 12. By setting the second predetermined charging duration based at least in part on the second electrical power 53B, the PSU control circuit 12 may dynamically select the second predetermined charging duration to reflect an estimated temperature accumulated at the PSU 10, with the second electrical power 53B acting as a proxy for the temperature. The relationship between the second electrical power 53B and the temperature of the PSU 10 may, for example, be estimated from experimental data. This also may aid in more precisely controlling the temperature of the PSU 10, while allowing for a potential increase the performance of the electronic device 30.

The PSU control circuit 12 may be configured to set the first predetermined charging duration 62 and the second predetermined charging duration 64 without reference to a temperature measurement. Thus, determination of the amount of electrical power supplied to the electronic device 30 may be simplified relative to existing PSUs in which the amount of supplied power is dynamically adjusted based on PSU temperature. In examples in which the first predetermined charging duration 62 and the second predetermined charging duration 64 are determined without reference to a temperature measurement, a temperature sensor 22 may still be included in the PSU 10 in order to provide emergency shutdown capabilities.

Figure 4:
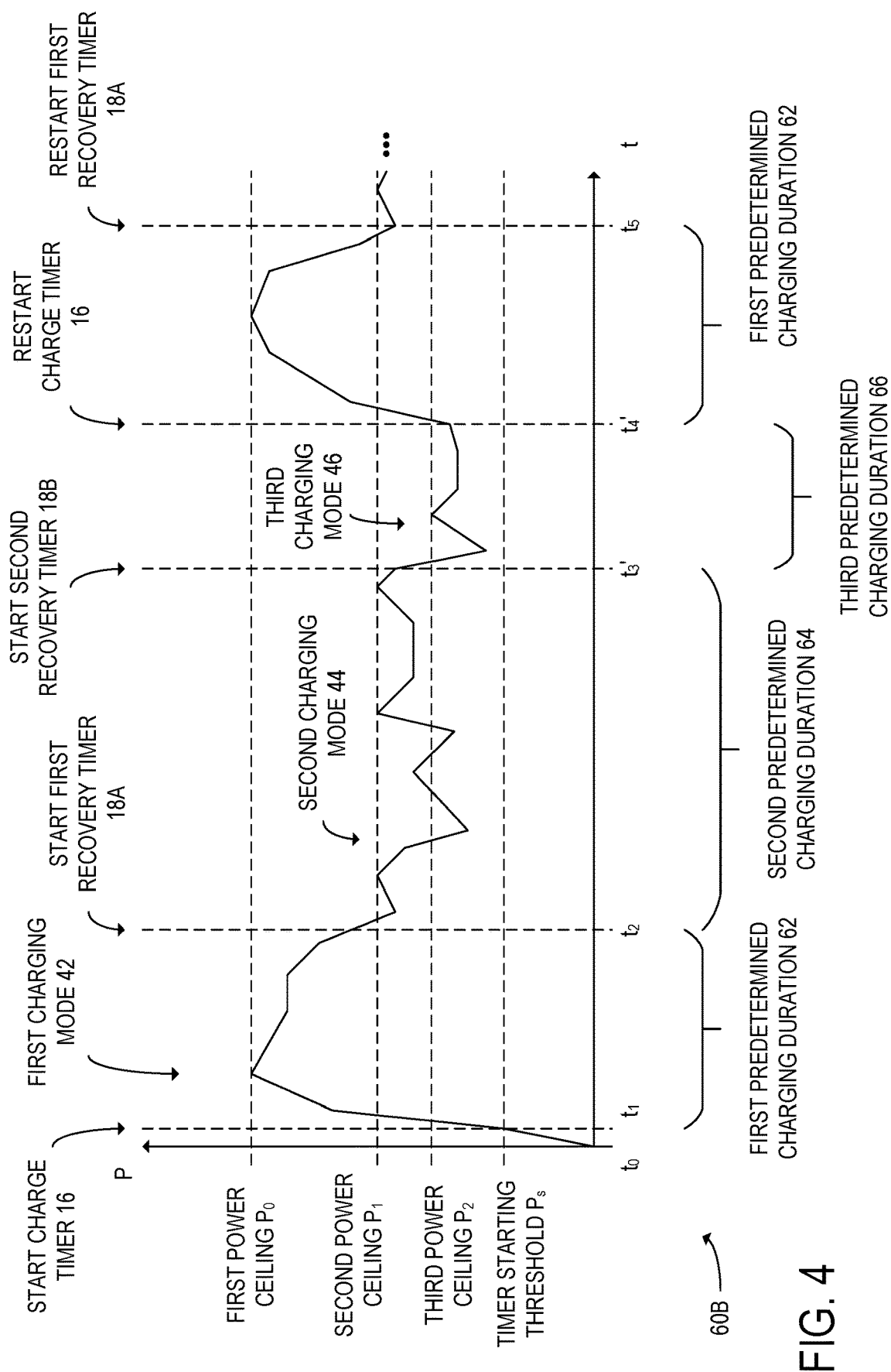
FIG. 4 shows an example second plot of the electrical power provided to the electronic device as a function of time during a first predetermined charging duration, a second predetermined charging duration, and a third predetermined charging duration, according to the example of FIGS. 1A and 1B.

In some examples, as shown in FIG. 4, the PSU 10 may have more than two charging modes. FIG. 4 shows an example second plot 60B of the electrical power P provided to the electronic device 30 as a function of time t. As depicted in the example of FIG. 4, subsequently to the second predetermined charging duration 64 elapsing and prior to returning to the first charging mode 42, the PSU control circuit 12 may be further configured to control the PSU 10 to enter a third charging mode 46. In the third charging mode 46, the PSU control circuit 12 may be configured to control the PSU 10 to convey electrical power to the electronic device 30 with a third power ceiling $P_2$ that is lower than the second power ceiling $P_1$.

The PSU 10 may be configured to remain in the third charging mode 46 for a third predetermined charging duration 66. Subsequently to the third predetermined charging duration 66 elapsing, the PSU control circuit 12 may be configured to control the PSU 10 to return to the first charging mode 42. In the example of FIG. 4, the PSU control circuit 12 is configured to start a first recovery timer 18A at time $t_2$ when entering the second charging mode 44 and is further configured to start a second recovery timer 18B at time $t_3'$ at the end of the second predetermined charging duration 64, when the PSU 10 enters the third charging mode 46. When the second recovery timer 18B reaches zero at time $t_4'$, the PSU control circuit 12 controls the PSU 10 to return to the first charging mode 42 and restart the charge timer 16. The PSU 10 may be configured to cycle through the first charging mode 42, the second charging mode 44, and the third charging mode 46. In the example of FIG. 4, the PSU control circuit 12 is configured to control the PSU 10 to restart the first recovery timer 18A and return to the second charging mode 44 at time t₅ when the first predetermined charging duration 62 has elapsed.

In some examples, the PSU 10 may be configured to have more than three charging modes. In such examples, the plurality of charging modes may have a respective plurality of monotonically decreasing power ceilings. Alternatively, the plurality of charging modes may include one or more charging modes that are configured to occur between a charging mode with a lowest power ceiling and a return to the first charging mode 42.

In examples in which the PSU 10 has three or more charging modes, each of those charging modes may have a corresponding charging mode indicator that is transmitted to the electronic device 30 when the PSU 10 begins providing electrical power to the electronic device 30 in that charging mode. In addition, the respective durations of the charging modes may be specified at least in part by the charging schedule input 74.

Returning to FIG. 3, in some examples, the PSU control circuit 12 may be further configured to determine, in response to the first predetermined charging duration 62 elapsing, that the electrical power conveyed to the electronic device 30 is within a predetermined power change threshold 70 of the first power ceiling $P_0$. The electrical power being within the predetermined power change threshold 70 of the first power ceiling $P_0$ may indicate that the PSU 10 is still operating with high efficiency even though the first predetermined charging duration 62 has elapsed. In response to determining that the electrical power is within the predetermined power change threshold 70 of the first power ceiling $P_0$, the PSU control circuit 12 may be further configured to control the PSU 10 to remain in the first charging mode 42 for an additional charging duration 72 prior to entering the second charging mode 44. In some examples, as shown in FIG. 3, the additional charging duration 72 may be determined based at least in part on the second electrical power 53B that is conveyed to the electronic device 30 when the first predetermined charging duration 62 elapses. Additionally or alternatively, the additional charging duration 72 may be determined based at least in part on the charging schedule input 74. For example, the user may specify the length of the additional charging duration 72 when the user makes the charging schedule input 74.

Figure 5:
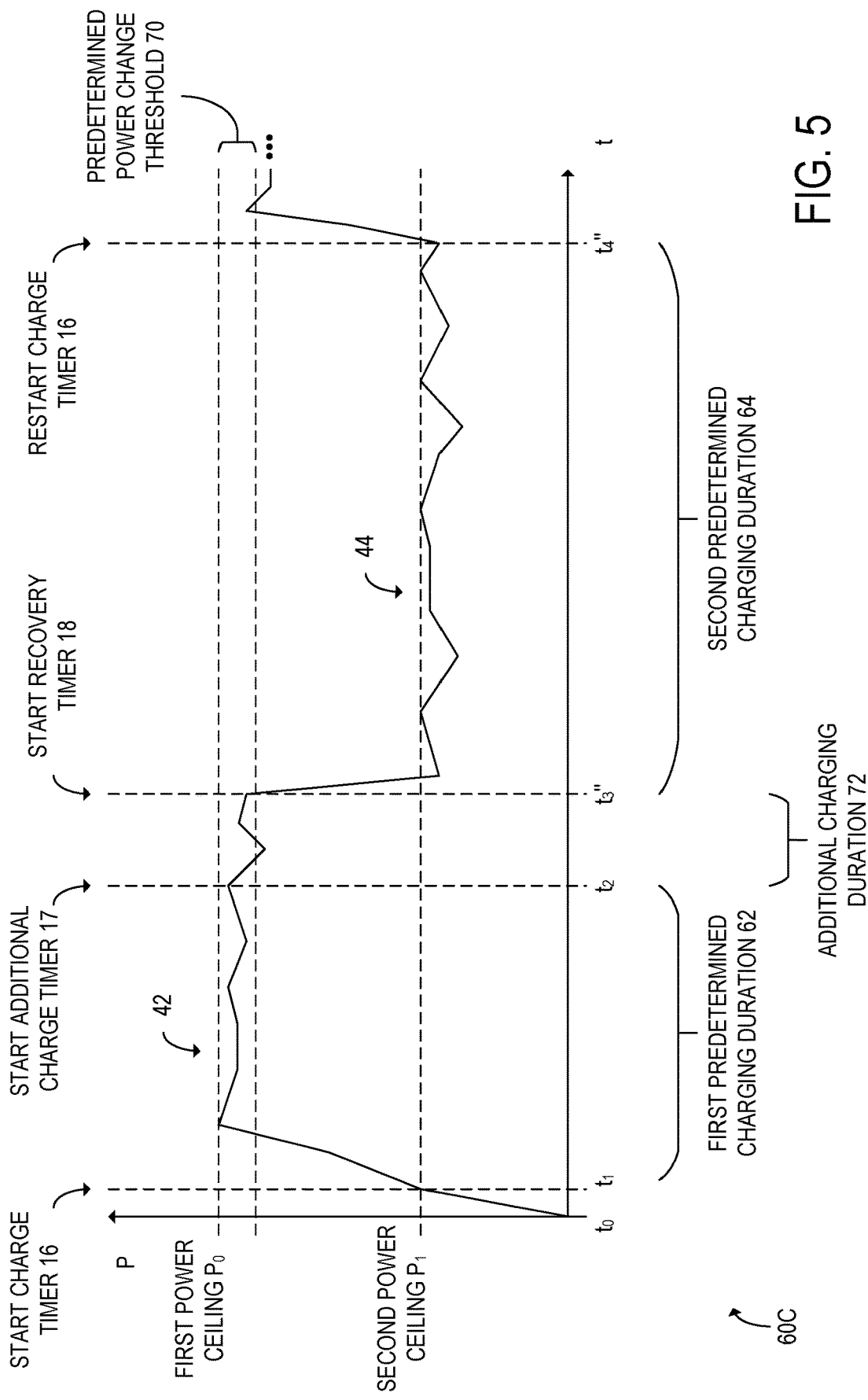
FIG. 5 shows an example third plot of the electrical power provided to the electronic device as a function of time during a first predetermined charging duration, an additional charging duration, and a second predetermined charging duration, according to the example of FIGS. 1A and 1B.

FIG. 5 shows an example third plot 60C of the electrical power P provided to the electronic device 30 as a function of time t. When the first predetermined charging duration 62 ends at time $t_2$, the PSU control circuit 12 may be configured to determine that the electrical power supplied to the electronic device 30 is within the predetermined power change threshold 70 of the first power ceiling $P_0$ and may be further configured to start the additional charge timer 17 in response to such a determination. At time $t_3"$, when the additional charging duration 72 elapses, the PSU control circuit 12 may be configured to start the recovery timer 18 and enter the second charging mode 44. At time $t_4"$, when the second predetermined charging duration 64 has elapsed, the PSU control circuit 12 may be further configured to restart the charge timer 16 and return to the first charging mode 42.

When, at the end of the first predetermined charging duration 62, the electrical power provided to the electronic device 30 is below the first power ceiling $P_0$ by more than the predetermined power change threshold 70, the PSU control circuit 12 may instead be configured to control the PSU 10 to enter the second charging mode 44. For example, when the power transmitted to the electronic device 30 has dropped by more than the predetermined power change threshold 70 relative to the first power ceiling $P_0$ due to the battery 32 of the electronic device 30 approaching a fully charged state, the PSU control circuit 12 may be configured to control the PSU 10 to enter the second charging mode 44 for the second predetermined charging duration 64.

Figure 6A:
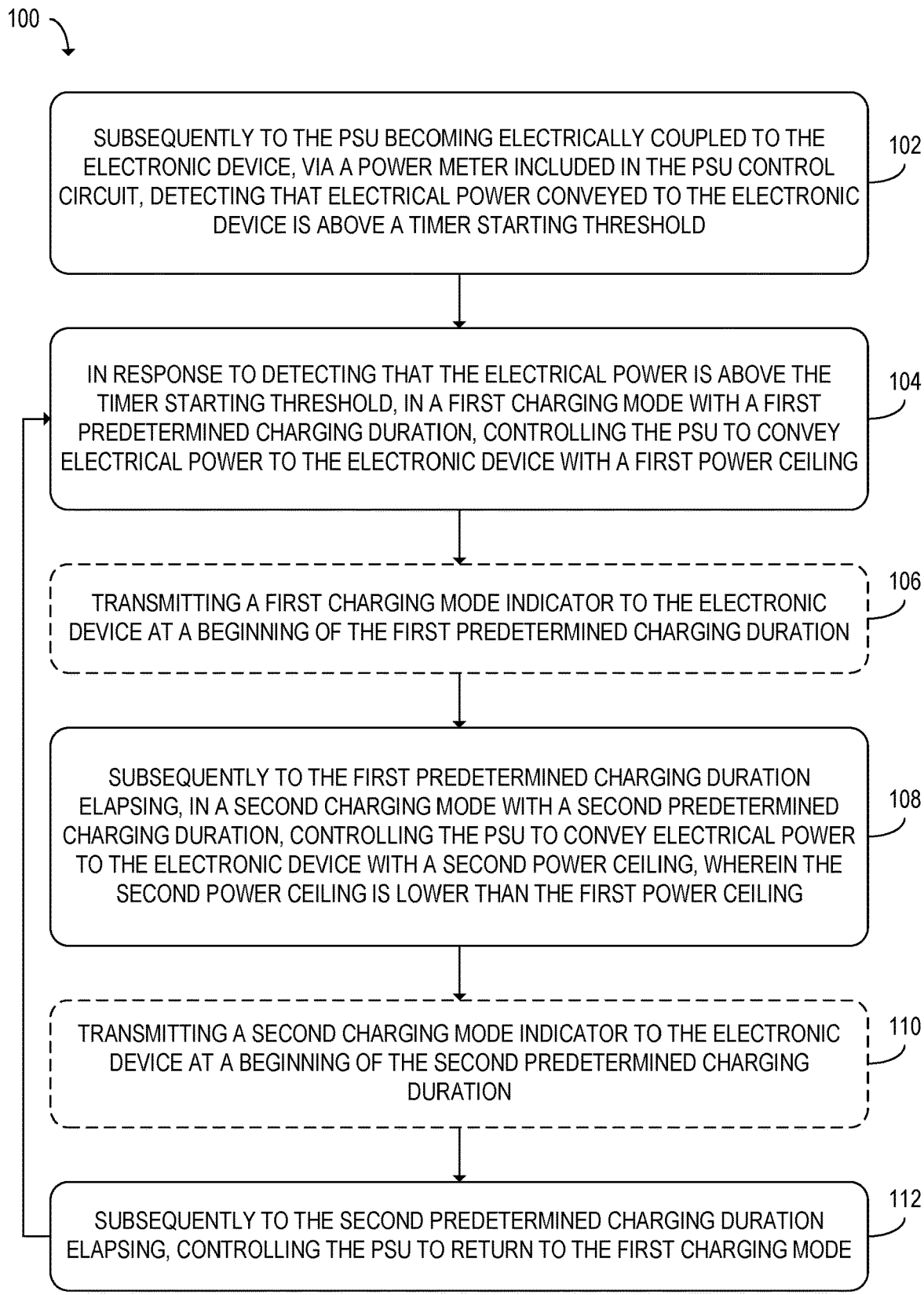
FIG. 6A shows a flowchart of a method for use with a PSU configured to provide electrical power to an electronic device, according to the example of FIGS. 1A and 1B.

FIG. 6A shows a flowchart of a method 100 for use with a PSU. The PSU may be configured to provide electrical power to an electronic device, which may include a battery. The electronic device may be a portable electronic device or may alternatively be a non-portable electronic device with battery backup. The steps of the method 100 may be performed at a PSU control circuit of the PSU and may be performed while the PSU is electrically coupled to the electronic device. At step 102, the method 100 may include, subsequently to the PSU becoming electrically coupled to the electronic device, detecting that electrical power conveyed to the electronic device is above a timer starting threshold. This detection may be made via a power meter included in the PSU control circuit.

At step 104, in response to detecting that the electrical power is above the timer starting threshold, the method 100 may further include controlling the PSU to convey electrical power to the electronic device with a first power ceiling. When the PSU is controlled to convey electrical power with the first power ceiling, the PSU may be in a first charging mode with a first predetermined charging duration. The first predetermined charging duration may be indicated by a charge timer that is included in the PSU control circuit and that starts when the PSU enters the first charging mode. While the PSU is in the first charging mode, when the electrical power conveyed to the electronic device reaches the first power ceiling, the PSU control circuit may reduce the electrical power the PSU outputs such that the electrical power remains below the first power ceiling.

In some examples, the method 100 may further include, at step 106, transmitting a first charging mode indicator to the electronic device at a beginning of the first predetermined charging duration. Thus, the PSU control circuit may notify the electronic device that the PSU has entered the first charging mode.

At step 108, the method 100 may further include, subsequently to the first predetermined charging duration elapsing, controlling the PSU to convey electrical power to the electronic device with a second power ceiling. Electrical power may be conveyed with the second power ceiling in a second charging mode with a second predetermined charging duration. The second power ceiling may be lower than the first power ceiling such that the allowed power supplied to the electronic device during the second predetermined charging duration is lower than the allowed power supplied during the first predetermined charging duration. Thus, the second predetermined charging duration may be a cooling period in which the amount of heat emitted at the power supply is reduced.

At step 110, in some examples, the method 100 may further include transmitting a second charging mode indicator to the electronic device at a beginning of the second predetermined charging duration. The second charging mode indicator may, for example, include instructions for the electronic device to enter a power-saving mode. In some examples in which step 106 and step 110 are performed, neither the first charging mode indicator nor the second charging mode indicator indicates an emergency shutdown threshold or a temperature measurement. In some examples, the PSU control circuit may instead be configured to transmit a first charging mode indicator that indicates the first predetermined charging duration and to transmit a second charging mode indicator that indicates the second predetermined charging duration. By transmitting the charging indicators to the electronic device, the PSU control circuit may allow the electronic device to modify the execution of one or more computing processes based at least in part on an indication of electrical power availability included in a charging indicator. This may further aid in more precisely controlling the temperature of the PSU 10, while allowing for a potential increase the performance of the electronic device 30.

At step 112, subsequently to the second predetermined charging duration elapsing, the method 100 may further include controlling the PSU to return to the first charging mode. When the PSU is controlled to return to the first charging mode, the method 100 may return to step 104. The method 100 may accordingly loop between the first charging mode and the second charging mode.

Figure 6B:
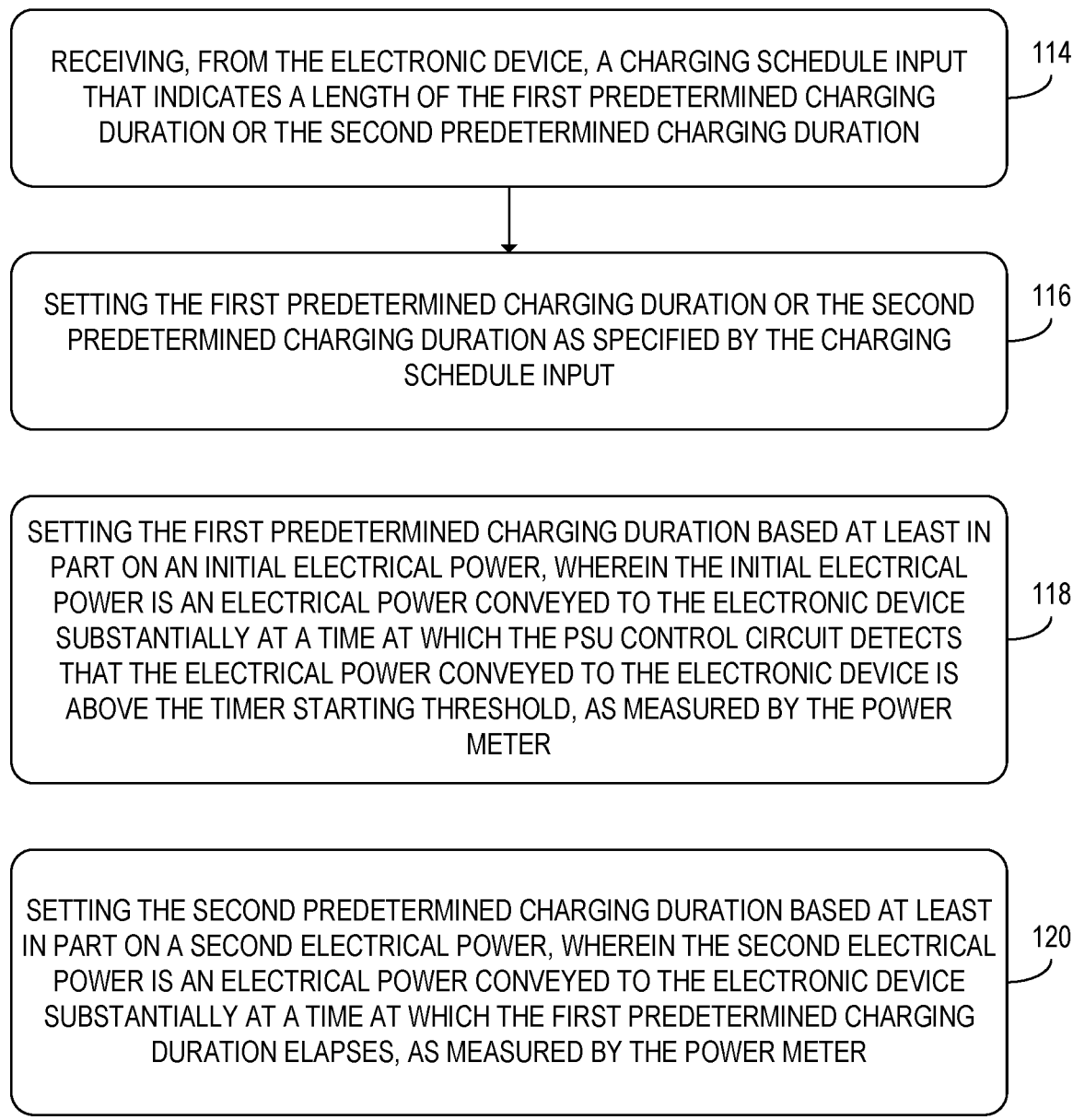
FIG. 6B shows additional steps of the method of FIG. 6A that may be performed in some examples in order to set the respective lengths of the first predetermined charging duration and/or the second predetermined charging duration.

FIG. 6B shows additional steps of the method 100 that may be performed in some examples in order to set the respective lengths of the first predetermined charging duration and/or the second predetermined charging duration. The length of the first predetermined charging duration may, for example, be determined when the PSU is initially coupled to the electronic device or when the PSU control circuit detects that the electrical power conveyed to the electronic device is above the timer starting threshold. The first predetermined charging duration and the second predetermined charging duration may be set without reference to a temperature measurement.

In some examples, at step 114, the method 100 may further include receiving, from the electronic device, a charging schedule input that indicates a length of the first predetermined charging duration or the second predetermined charging duration. In examples in which step 114 is performed, the method 100 may further include, at step 116, setting the first predetermined charging duration or the second predetermined charging duration as specified by the charging schedule input. The first predetermined charging duration and/or the second predetermined charging duration may be explicitly indicated in the charging schedule input or may alternatively be computed at the PSU control circuit based on other data as well as the charging schedule input.

In some examples, data included in the charging schedule input may be stored at the PSU control circuit and reused in one or more subsequent charging sessions. Alternatively, the charging schedule input may be received from the electronic device during each charging session. In some examples, separate charging schedule inputs are received for the first predetermined charging duration and the second predetermined charging duration.

Additionally or alternatively to steps 114 and 116, the method 100 may further include, at step 118, setting the first predetermined charging duration based at least in part on an initial electrical power. The initial electrical power may be an electrical power conveyed to the electronic device when the PSU control circuit detects that the electrical power conveyed to the electronic device is above the timer starting threshold, as measured by the power meter. In some examples, performing step 118 may include determining a rate of change in the power conveyed to the electronic device when the power crosses the timer starting threshold. Thus, for example, the PSU control circuit may be configured to distinguish scenarios in which the battery has a low charge when the PSU is initially connected to the electronic device from scenarios in which the battery has a high charge and the other electronic components increase their power consumption while the PSU is coupled to the electronic device.

At step 120, the method 100 may further include setting the second predetermined charging duration based at least in part on a second electrical power. The second electrical power is an electrical power conveyed to the electronic device when the first predetermined charging duration elapses, as measured by the power meter. In some examples, performing step 120 may include referring to a lookup table that maps amounts of electrical power at the end of the first predetermined charging duration to respective lengths for the second predetermined charging duration. The length of the second predetermined charging duration may, for example, increase as the second electrical power increases.

FIG. 6C shows additional steps of the method 100 that may be performed in some examples when the first predetermined charging duration ends, prior to step 108. At step 122, the method 100 may further include, in response to the first predetermined charging duration elapsing, determining that the electrical power conveyed to the electronic device is within a predetermined power change threshold of the first power ceiling. At step 124, in response to determining that the electrical power is within the predetermined power change threshold of the first power ceiling, the method 100 may further include controlling the PSU to remain in the first charging mode for an additional charging duration prior to entering the second charging mode. Thus, when the PSU control circuit detects that the power supplied to the electronic device has not dropped below the first power ceiling minus the predetermined power change threshold (e.g. when the battery is not close to a fully charged state), the PSU control circuit may be configured to control the PSU to continue charging the electronic device in the first charging mode. In examples in which steps 114 and 116 are performed, the additional charging duration may be set based at least in part on the charging schedule input.

FIG. 6D shows additional steps of the method 100 that may be performed in some examples when the second predetermined charging duration ends, prior to step 112. At step 126, the method 100 may further include, subsequently to the second predetermined charging duration elapsing and prior to returning to the first charging mode, controlling the PSU to convey electrical power to the electronic device with a third power ceiling. The PSU may be controlled to convey power with the third power ceiling in a third charging mode with a third predetermined charging duration. In addition, the third power ceiling may be lower than the second power ceiling. The PSU may accordingly have two recovery periods with different power ceilings. At step 128, subsequently to the third predetermined charging duration elapsing, the method 100 may further include returning to the first charging mode. The PSU control circuit may be configured to control the PSU to cycle through the first charging mode, the second charging mode, and the third charging mode. In some examples, more than three charging modes with different power ceilings may be used. The respective durations of the plurality of charging modes may be set based at least in part on the charging schedule input in examples in which steps 114 and 116 are performed.

Using the devices and methods discussed above, a PSU may be controlled to provide electrical power to an electronic device in a more efficient manner compared to previous PSUs. The devices and methods discussed above may allow the amount of energy wasted when the electronic device is substantially fully charged to be reduced. The PSU case and PSU magnetic assembly may accordingly be designed to radiate smaller amounts of heat at their peak levels of heat output, thereby allowing the size of the PSU case and the PSU magnetic assembly to be reduced. This size reduction may allow the PSU to be manufactured using fewer raw materials. The devices and methods discussed above may also make the PSU more comfortable for users to handle by reducing the peak temperature reached by the PSU.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
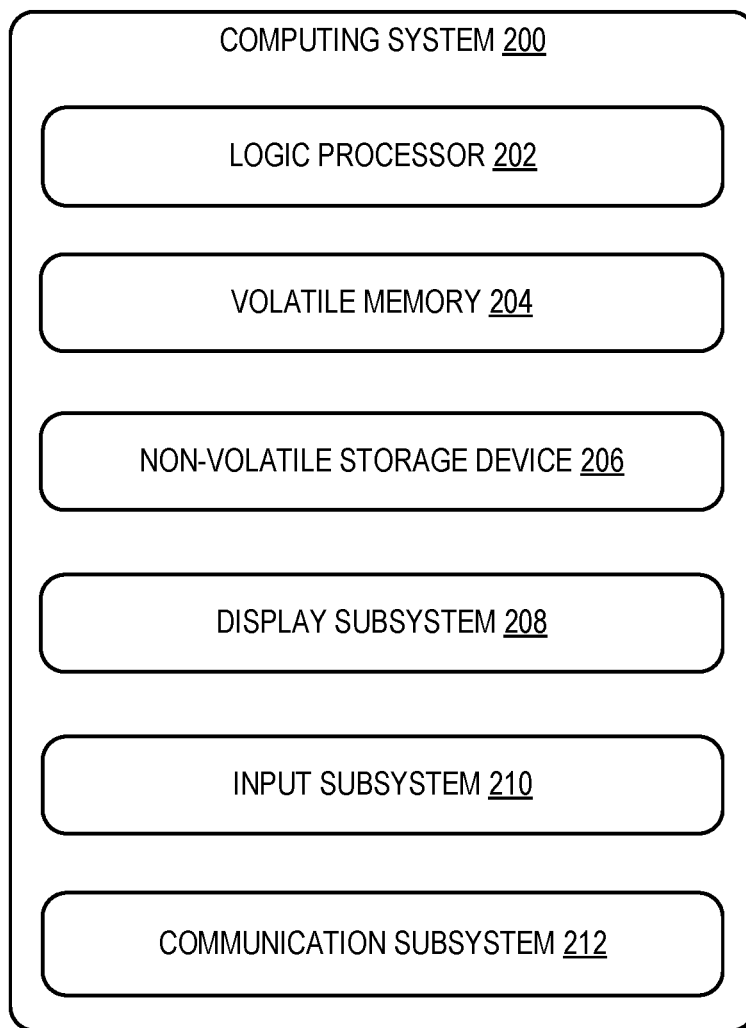
FIG. 7 shows a schematic view of an example computing environment in which the PSU and/or the electronic device of FIG. 1A or 1B may be enacted.

FIG. 7 schematically shows a non-limiting embodiment of a computing system 200 that can enact one or more of the methods and processes described above. Computing system 200 is shown in simplified form. Computing system 200 may include components of the PSU 10, the electronic device 30 described above and illustrated in FIG. 1A, and/or the electronic device 30A described above and illustrated in FIG. 1B. Computing system 200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 200 includes a logic processor 202 volatile memory 204, and a non-volatile storage device 206. Computing system 200 may optionally include a display subsystem 208, input subsystem 210, communication subsystem 212, and/or other components not shown in FIG. 7.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via logic processor 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a graphical user interface (GUI). As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem may comprise or interface with selected natural user input (NUI) componentry.

Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 200 to send and/or receive messages to and/or from other devices via a network such as the Internet.

The following paragraphs discuss several aspects of the present disclosure. According to one aspect of the present disclosure, a power supply unit (PSU) configured to provide electrical power to an electronic device including a battery is provided. The PSU may include a PSU control circuit configured to, subsequently to the PSU becoming electrically coupled to the electronic device, detect that electrical power conveyed to the electronic device is above a timer starting threshold via a power meter included in the PSU control circuit. In response to detecting that the electrical power is above the timer starting threshold, in a first charging mode with a first predetermined charging duration, the PSU control circuit may be further configured to control the PSU to convey electrical power to the electronic device with a first power ceiling. Subsequently to the first predetermined charging duration elapsing, in a second charging mode with a second predetermined charging duration, the PSU control circuit may be further configured to control the PSU to convey electrical power to the electronic device with a second power ceiling. The second power ceiling may be lower than the first power ceiling. Subsequently to the second predetermined charging duration elapsing, the PSU control circuit may be further configured to control the PSU to return to the first charging mode.

According to this aspect, the PSU control circuit may be configured to set the first predetermined charging duration based at least in part on an initial electrical power. The initial electrical power may be an electrical power conveyed to the electronic device substantially at a time at which the PSU control circuit detects that the electrical power conveyed to the electronic device is above the timer starting threshold, as measured by the power meter.

According to this aspect, the PSU control circuit may be configured to set the second predetermined charging duration based at least in part on a second electrical power. The second electrical power may be an electrical power conveyed to the electronic device substantially at a time at which the first predetermined charging duration elapses, as measured by the power meter.

According to this aspect, in response to the first predetermined charging duration elapsing, the PSU control circuit may be further configured to determine that the electrical power conveyed to the electronic device is within a predetermined power change threshold of the first power ceiling. In response to determining that the electrical power is within the predetermined power change threshold of the first power ceiling, the PSU control circuit may be further configured to control the PSU to remain in the first charging mode for an additional charging duration prior to entering the second charging mode.

According to this aspect, the PSU control circuit may be further configured to transmit a first charging mode indicator to the electronic device at a beginning of the first predetermined charging duration. The PSU control circuit may be further configured to transmit a second charging mode indicator to the electronic device at a beginning of the second predetermined charging duration.

According to this aspect, the second charging mode indicator may include instructions for the electronic device to enter a power-saving mode.

According to this aspect, in response to returning to the first charging mode, the PSU control circuit may be further configured to transmit a third charging mode indicator to the electronic device. The third charging mode indicator may include instructions for the electronic device to exit the power-saving mode.

According to this aspect, neither the first charging mode indicator nor the second charging mode indicator may indicate an emergency shutdown threshold or a temperature measurement.

According to this aspect, the PSU control circuit may be further configured to receive, from the electronic device, a charging schedule input that indicates a length of the first predetermined charging duration or the second predetermined charging duration. The PSU control circuit may be further configured to set the first predetermined charging duration or the second predetermined charging duration as specified by the charging schedule input.

According to this aspect, subsequently to the second predetermined charging duration elapsing and prior to returning to the first charging mode, the PSU control circuit may be further configured to, in a third charging mode with a third predetermined charging duration, control the PSU to convey electrical power to the electronic device with a third power ceiling. The third power ceiling may be lower than the second power ceiling. Subsequently to the third predetermined charging duration elapsing, the PSU control circuit may be further configured to return to the first charging mode.

According to this aspect, the PSU control circuit may be configured to set the first predetermined charging duration and the second predetermined charging duration without reference to a temperature measurement.

According to this aspect, the electronic device may be a mobile computing device.

According to another aspect of the present disclosure, a method for use with a power supply unit (PSU) configured to provide electrical power to an electronic device including a battery is provided. The method may include, at a PSU control circuit of the PSU, subsequently to the PSU becoming electrically coupled to the electronic device, detecting that electrical power conveyed to the electronic device is above a timer starting threshold via a power meter included in the PSU control circuit. In response to detecting that the electrical power is above the timer starting threshold, the method may further include, in a first charging mode with a first predetermined charging duration, controlling the PSU to convey electrical power to the electronic device with a first power ceiling. Subsequently to the first predetermined charging duration elapsing, the method may further include, in a second charging mode with a second predetermined charging duration, controlling the PSU to convey electrical power to the electronic device with a second power ceiling. The second power ceiling may be lower than the first power ceiling. Subsequently to the second predetermined charging duration elapsing, the method may further include controlling the PSU to return to the first charging mode.

According to this aspect, the method may further include, at the control circuit of the PSU, setting the first predetermined charging duration based at least in part on an initial electrical power. The initial electrical power may be an electrical power conveyed to the electronic device substantially at a time at which the PSU control circuit detects that the electrical power conveyed to the electronic device is above the timer starting threshold, as measured by the power meter.

According to this aspect, the method may further include, at the control circuit of the PSU, setting the second predetermined charging duration based at least in part on a second electrical power. The second electrical power may be an electrical power conveyed to the electronic device substantially at a time at which the first predetermined charging duration elapses, as measured by the power meter.

According to this aspect, the method may further include, at the PSU control circuit, in response to the first predetermined charging duration elapsing, determining that the electrical power conveyed to the electronic device is within a predetermined power change threshold of the first power ceiling. In response to determining that the electrical power is within the predetermined power change threshold of the first power ceiling, the method may further include controlling the PSU to remain in the first charging mode for an additional charging duration prior to entering the second charging mode.

According to this aspect, the method may further include transmitting a first charging mode indicator to the electronic device at a beginning of the first predetermined charging duration. The method may further include transmitting a second charging mode indicator to the electronic device at a beginning of the second predetermined charging duration.

According to this aspect, the second charging mode indicator may include instructions for the electronic device to enter a power-saving mode.

According to this aspect, the method may further include receiving, from the electronic device, a charging schedule input that indicates a length of the first predetermined charging duration or the second predetermined charging duration. The method may further include setting the first predetermined charging duration or the second predetermined charging duration as specified by the charging schedule input.

According to another aspect of the present disclosure, a power supply unit (PSU) configured to provide electrical power to an electronic device including a battery is provided. The PSU may include a PSU control circuit configured to, subsequently to the PSU becoming electrically coupled to the electronic device, detect that electrical power conveyed to the electronic device is above a timer starting threshold via a power meter included in the PSU control circuit. In response to detecting that the electrical power is above the timer starting threshold, the PSU control circuit may be further configured to determine a first predetermined charging duration based at least in part on an initial electrical power. The initial electrical power may be an electrical power conveyed to the electronic device substantially at a time at which the PSU control circuit detects that the electrical power conveyed to the electronic device is above the timer starting threshold, as measured by the power meter.

The PSU control circuit may be further configured to, in a first charging mode with the first predetermined charging duration, control the PSU to convey electrical power to the electronic device with a first power ceiling. Subsequently to the first predetermined charging duration elapsing, the PSU control circuit may be further configured to determine a second predetermined charging duration based at least in part on a second electrical power. The second electrical power may be an electrical power conveyed to the electronic device substantially at a time at which the first predetermined charging duration elapses, as measured by the power meter. The PSU control circuit may be further configured to, in a second charging mode with the second predetermined charging duration, control the PSU to convey electrical power to the electronic device with a second power ceiling. The second power ceiling may be lower than the first power ceiling. Subsequently to the second predetermined charging duration elapsing, the PSU control circuit may be further configured to control the PSU to return to the first charging mode.

"And/or" as used herein is defined as the inclusive or v, as specified by the following truth table:

| A | B | A v B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A power supply unit (PSU) configured to provide electrical power to an electronic device including a battery, the PSU comprising:
   a PSU control circuit configured to:
      subsequently to the PSU becoming electrically coupled to the electronic device:
         via a power meter included in the PSU control circuit, detect that electrical power conveyed to the electronic device crosses a timer starting threshold having a predetermined value greater than zero but less than a first power ceiling; and
         in response to detecting that the electrical power crosses the timer starting threshold having the predetermined value greater than zero but less than the first power ceiling:
            start a charge timer to measure a first predetermined charging duration; and
            control the PSU to convey electrical power to the electronic device in a first charging mode with the first power ceiling for the first predetermined charging duration, wherein the first power ceiling is above the timer starting threshold;

subsequently to the first predetermined charging duration elapsing as indicated by the charge timer, in a second charging mode with a second predetermined charging duration, control the PSU to convey electrical power to the electronic device with a second power ceiling, wherein the second power ceiling is lower than the first power ceiling; and subsequently to the second predetermined charging duration elapsing, control the PSU to return to the first charging mode.

2. The PSU of claim 1, wherein the PSU control circuit is configured to set the first predetermined charging duration based at least in part on an initial electrical power, wherein the initial electrical power is an electrical power conveyed to the electronic device substantially at a time at which the PSU control circuit detects that the electrical power conveyed to the electronic device crosses the timer starting threshold, as measured by the power meter.

3. The PSU of claim 1, wherein the PSU control circuit is configured to set the second predetermined charging duration based at least in part on a second electrical power, wherein the second electrical power is an electrical power conveyed to the electronic device substantially at a time at which the first predetermined charging duration elapses, as measured by the power meter.

4. The PSU of claim 1, wherein, in response to the first predetermined charging duration elapsing, the PSU control circuit is further configured to:
determine that the electrical power conveyed to the electronic device is within a predetermined power change threshold of the first power ceiling; and
in response to determining that the electrical power is within the predetermined power change threshold of the first power ceiling, control the PSU to remain in the first charging mode for an additional charging duration prior to entering the second charging mode.

5. The PSU of claim 1, wherein the PSU control circuit is further configured to:
transmit a first charging mode indicator to the electronic device at a beginning of the first predetermined charging duration; and
transmit a second charging mode indicator to the electronic device at a beginning of the second predetermined charging duration.

6. The PSU of claim 5, wherein the second charging mode indicator includes instructions for the electronic device to enter a power-saving mode.

7. The PSU of claim 6, wherein:
in response to returning to the first charging mode, the PSU control circuit is further configured to transmit a third charging mode indicator to the electronic device; and
the third charging mode indicator includes instructions for the electronic device to exit the power-saving mode.

8. The PSU of claim 5, wherein neither the first charging mode indicator nor the second charging mode indicator indicates an emergency shutdown threshold or a temperature measurement.

9. The PSU of claim 1, wherein the PSU control circuit is further configured to:
receive, from the electronic device, a charging schedule input that indicates a length of the first predetermined charging duration or the second predetermined charging duration; and
set the first predetermined charging duration or the second predetermined charging duration as specified by the charging schedule input.

10. The PSU of claim 1, wherein, subsequently to the second predetermined charging duration elapsing and prior to returning to the first charging mode, the PSU control circuit is further configured to:
in a third charging mode with a third predetermined charging duration, control the PSU to convey electrical power to the electronic device with a third power ceiling, wherein the third power ceiling is lower than the second power ceiling; and
subsequently to the third predetermined charging duration elapsing, return to the first charging mode.

11. The PSU of claim 1, wherein the PSU control circuit is configured to set the first predetermined charging duration and the second predetermined charging duration without reference to a temperature measurement.

12. The PSU of claim 1, wherein the electronic device is a mobile computing device.

13. A method for use with a power supply unit (PSU) configured to provide electrical power to an electronic device including a battery, the method comprising, at a PSU control circuit of the PSU:
subsequently to the PSU becoming electrically coupled to the electronic device:
via a power meter included in the PSU control circuit, detecting that electrical power conveyed to the electronic device crosses a timer starting threshold having a predetermined value greater than zero but less than a first power ceiling; and
in response to detecting that the electrical power crosses the timer starting threshold having the predetermined value greater than zero but less than the first power ceiling:
starting a charge timer to measure a first predetermined charging duration; and
controlling the PSU to convey electrical power to the electronic device in a first charging mode with the first power ceiling for the first predetermined charging duration, wherein the first power ceiling is above the timer starting threshold;
subsequently to the first predetermined charging duration elapsing as indicated by the charge timer, in a second charging mode with a second predetermined charging duration, controlling the PSU to convey electrical power to the electronic device with a second power ceiling, wherein the second power ceiling is lower than the first power ceiling; and
subsequently to the second predetermined charging duration elapsing, controlling the PSU to return to the first charging mode.

14. The method of claim 13, further comprising, at the control circuit of the PSU, setting the first predetermined charging duration based at least in part on an initial electrical power, wherein the initial electrical power is an electrical power conveyed to the electronic device substantially at a time at which the PSU control circuit detects that the electrical power conveyed to the electronic device crosses the timer starting threshold, as measured by the power meter.

15. The method of claim 14, further comprising, at the PSU control circuit, in response to the first predetermined charging duration elapsing:
determining that the electrical power conveyed to the electronic device is within a predetermined power change threshold of the first power ceiling; and in response to determining that the electrical power is within the predetermined power change threshold of the first power ceiling, controlling the PSU to remain in the first charging mode for an additional charging duration prior to entering the second charging mode.

16. The method of claim 13, further comprising, at the control circuit of the PSU, setting the second predetermined charging duration based at least in part on a second electrical power, wherein the second electrical power is an electrical power conveyed to the electronic device substantially at a time at which the first predetermined charging duration elapses, as measured by the power meter.

17. The method of claim 13, further comprising:
transmitting a first charging mode indicator to the electronic device at a beginning of the first predetermined charging duration; and
transmitting a second charging mode indicator to the electronic device at a beginning of the second predetermined charging duration.

18. The method of claim 17, wherein the second charging mode indicator includes instructions for the electronic device to enter a power-saving mode.

19. The method of claim 13, further comprising:
receiving, from the electronic device, a charging schedule input that indicates a length of the first predetermined charging duration or the second predetermined charging duration; and
setting the first predetermined charging duration or the second predetermined charging duration as specified by the charging schedule input.

20. A power supply unit (PSU) configured to provide electrical power to an electronic device including a battery, the PSU comprising:
a PSU control circuit configured to:
subsequently to the PSU becoming electrically coupled to the electronic device:
via a power meter included in the PSU control circuit, detect that electrical power conveyed to the electronic device crosses a timer starting threshold having a predetermined value greater than zero but less than a first power ceiling;
in response to detecting that the electrical power crosses the timer starting threshold having the predetermined value greater than zero but less than the first power ceiling, determine a first predetermined charging duration of a charge timer based at least in part on an initial electrical power, wherein the initial electrical power is an electrical power conveyed to the electronic device substantially at a time at which the PSU control circuit detects that the electrical power conveyed to the electronic device is above the timer starting threshold, as measured by the power meter;
start the charge timer to measure the first predetermined charging duration; and
control the PSU to convey electrical power to the electronic device in a first charging mode with the first power ceiling for the first predetermined charging duration, wherein the first power ceiling is above the timer starting threshold;
subsequently to the first predetermined charging duration elapsing as indicated by the charge timer:
determine a second predetermined charging duration based at least in part on a second electrical power, wherein the second electrical power is an electrical power conveyed to the electronic device substantially at a time at which the first predetermined charging duration elapses, as measured by the power meter; and
in a second charging mode with the second predetermined charging duration, control the PSU to convey electrical power to the electronic device with a second power ceiling, wherein the second power ceiling is lower than the first power ceiling; and
subsequently to the second predetermined charging duration elapsing, control the PSU to return to the first charging mode.

* * * * *